(No Model.)

J. E. WARNER.
WHEEL FOR CARRIAGES.

No. 551,516.  Patented Dec. 17, 1895.

Witnesses
Leonard W. Manchee
W. L. Bennem

Inventor
James Elam Warner

UNITED STATES PATENT OFFICE.

JAMES ELAM WARNER, OF CRANFORD, ASSIGNOR TO EDWARD SABINE RENWICK, OF MILLBURN, NEW JERSEY.

WHEEL FOR CARRIAGES.

SPECIFICATION forming part of Letters Patent No. 551,516, dated December 17, 1895.

Application filed August 17, 1895. Serial No. 559,689. (No model.)

*To all whom it may concern:*

Be it known that I, JAMES ELAM WARNER, of Cranford, in the county of Union and State of New Jersey, have invented certain new and useful Improvements in Wheels for Wheel-Carriages, such as Bicycles, Sulkies, &c.; and I do hereby declare that the following, in connection with the accompanying drawings, is a full, clear, and exact description and specification of the same.

My invention has reference to the construction of that class of elastic tires for carriage-wheels in which the elastic material or materials are contained within a sheath by which the material or materials which are relied upon to impart the requisite elasticity to the tire is or are protected from injury.

According to my invention the member of the tire which is relied upon in whole or in part to make the tire elastic is a helical spring or series of springs which are combined with the external sheath through the intervention of a tubular filling of flexible or elastic material, such as cork or a compound thereof, which surrounds the spring or springs and is interposed between the spring or springs and the sheath, with the practical effect that the sheath is prevented from being cut or injured by the working of the spring or springs.

My invention consists of a certain combination of devices which are recited in the claim at the close of this specification. In order that it may be fully understood I have represented in the accompanying drawings and will proceed to describe the best mode in which I have thus far embodied the invention for practical use, it being understood that the construction may be varied according to the views of different constructers or users of the invention.

Figure 1:
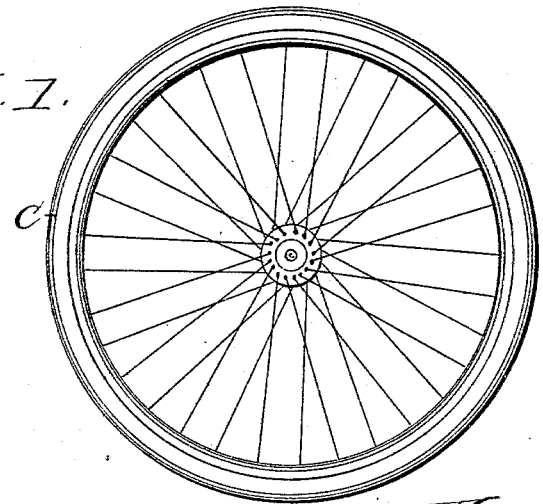
Figure 2:
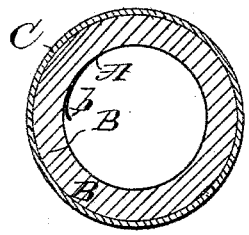
Figure 3:
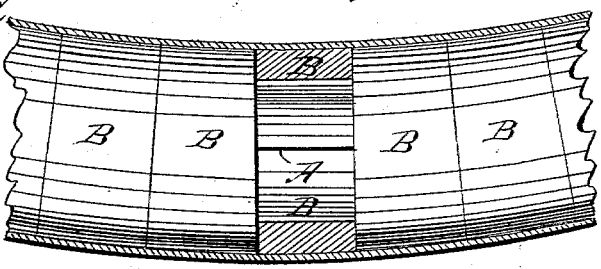
Figure 4:
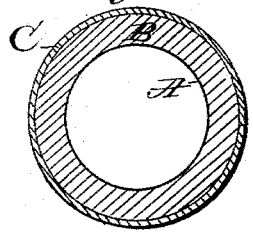
Figure 5:
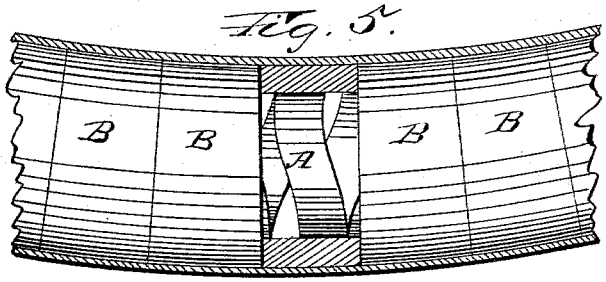
Figure 6:
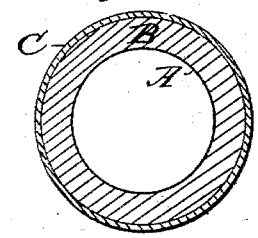
Figure 7:
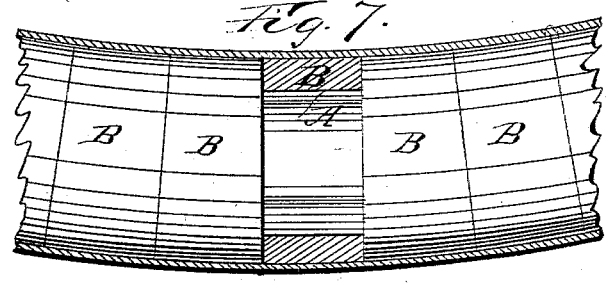

In the said drawings, Figure 1 represents a side view of a bicycle-wheel constructed according to my invention. Fig. 2 represents a transverse section of the tire thereof upon a larger scale than Fig. 1. Fig. 3 represents a corresponding vertical longitudinal view of the same, partly in section. Figs. 4 and 5 represent, respectively, corresponding transverse and vertical longitudinal views of a modification of the tire. Figs. 6 and 7 represent corresponding transverse and vertical longitudinal views of another modification of the tire.

The mode in which I prefer to construct my invention is represented in Figs. 1, 2, and 3. In this case the members which are mainly relied upon to impart elasticity to the tire consist of a series of ring-formed springs (represented by heavy black lines) A, each consisting of a thin strip of tempered steel bent into a ring form with the ends of the strip overlapping each other when inserted in the cork, the inner end *b* being slightly curved inward so that it will not bite upon the outer end when the ring-spring is compressed. Each of these springs is inserted in the cavity of a ring of cork B which surrounds the spring; and I prefer that the said cork shall be impregnated with glycerine or other non-drying substance which will tend to prevent it from breaking or disintegrating when in use. The series of rings of metallic springs and corks are inclosed within a tubular sheath C, of hoop form, adapted to fit the felly of the wheel to which the tire is to be applied; and this sheath may be formed of canvas, cemented together with india-rubber cement, so as to be impervious to moisture. The tire thus made is secured to the felly of the wheel preferably by the rubber cement commonly used for such purpose. In order that the metallic springs may exert the requisite elasticity they should be bent into circular form with their ends separated, and they should be compressed into a ring form with their ends overlapping when they are applied to the cavity in the cork ring; and I prefer that the cork rings should have their flat sides slightly inclined to each other, so that the rings will fit each other like arch-stones when combined in the sheath.

With the tire constructed as above described, pressure tending to flatten it causes the spring to contract, in which operation one end of each spring where the pressure is exerted slides upon the other, while as the pressure is reduced the spring regains its original form within the cork ring.

The cork ring B, which is the filling interposed between the spring A and the sheath C, protects the sheath from injury by every part of the spring, whose edges if in contact with the sheath would wear it or cut it by their play upon it in contracting and expanding, and as the interposed material in this case is cork, which is elastic, it aids in imparting elasticity to the tire, changing its form and contracting and expanding as pressure upon the tire is applied and withdrawn.

The series of springs of the preceding example of my invention may be replaced by one or more helical springs which extend through the cavities of a number of adjacent rings of flexible material interposed between the spring or springs and the sheath. An example of this construction of tire is shown in Figs. 4 and 5, in which the spring A consists of a ribbon of thin steel coiled in a helix and inserted within the cavities of a number of adjacent cork rings B B B. In this case the helix before insertion within the cavities of the cork should preferably be of larger diameter than those cavities and should be compressed by winding it tighter when the corks are applied to it. This helical spring for a tire may if preferred be made of a single ribbon, of steel, sufficiently long to extend around the tire, or it may be made of a series of shorter helixes forming sections whose adjacent ends may if preferred be connected by rivets.

Another modification of springs is represented in Figs. 6 and 7. In this case the spring has the form of a thin broad ring of steel A, one of which is inserted in the cavity of each cork ring B, and a series of these compound cork and steel rings is inclosed within the tubular hoop-formed sheath C to form a tire. In this case the steel springs do not materially contract under pressure, but change their form from circular to oval, and regain their circular form as the pressure is applied and withdrawn. Springs of this form should be made of thinner material than for the two preceding forms.

While I prefer steel as the material for the spring or springs my invention is not restricted to the use of that material, as the spring may be composed of another material, such as hard-rolled brass, but not in my opinion with so good a practical result. Also, in place of using solid cork impregnated with glycerine as the interposed material between the spring and the sheath, a vulcanized compound of granular cork and india-rubber may be used for the purpose, but I prefer to use the impregnated cork, as previously described.

The springs which I have used with success are made of sheet-steel of the thickness of No. 27 Birmingham wire-gage. They may, however, be made thicker or thinner according to the strains to which the tires are to be subjected, one of the advantages of the invention being that tires of uniform diameter may be adapted to the use of users of different weights by varying the strength of the internal spring, and the invention is particularly adapted to the construction of tires for vehicles drawn by horses.

I claim as my invention—

The elastic tire for carriage wheels consisting substantially as before set forth of an internal metallic spring, an external sheath, and a tubular filling of cork surrounding the spring and interposed between it and the sheath.

In witness whereof I have set my hand this 12th day of August, A. D. 1895.

JAMES ELAM WARNER.

Witnesses:
W. L. BENNEM,
I. S. HENTHORN.